United States Patent [19]

Sadowski et al.

[11] Patent Number: 5,527,991
[45] Date of Patent: Jun. 18, 1996

[54] GROUNDING STRAP FOR PANEL MOUNTED ELECTRICAL SWITCH

[75] Inventors: Walter A. Sadowski; Richard M. Olson, both of Newington; William R. Stephens, Rocky Hill, all of Conn.

[73] Assignee: Carlingswitch, Inc., Plainville, Conn.

[21] Appl. No.: 147,060

[22] Filed: Nov. 3, 1993

[51] Int. Cl.[6] ................................................ H01H 9/02
[52] U.S. Cl. ........................ 174/51; 174/53; 200/296; 439/96
[58] Field of Search .................. 174/51, 53; 200/296; 439/95, 96, 106, 107, 108, 538, 539, 567

[56] References Cited

U.S. PATENT DOCUMENTS

| | | | |
|---|---|---|---|
| 4,159,405 | 6/1979 | Semonchik et al. | 200/296 |
| 4,375,307 | 3/1983 | Rock | 439/107 |
| 4,461,938 | 7/1984 | Sorenson | 200/296 |
| 4,853,823 | 8/1989 | Arechavaleta | 361/100 |

*Primary Examiner*—Kristine L. Kincaid
*Assistant Examiner*—Paramita Ghosh
*Attorney, Agent, or Firm*—McCormick, Paulding & Huber

[57] ABSTRACT

A generally rectangular plastic switch housing has locating tabs that position a U-shaped hardened steel grounding strap on the housing so that the strap and housing can be conveniently mounted from the front of a panel in a panel opening that includes relieved and upset portions designed to make electrical contact with serrated segments of the U-shaped strap's legs. The base of the U-shaped strap has an opening with upset edges designed to make electrical contact with the center terminal in the bottom wall of the switch housing.

6 Claims, 2 Drawing Sheets

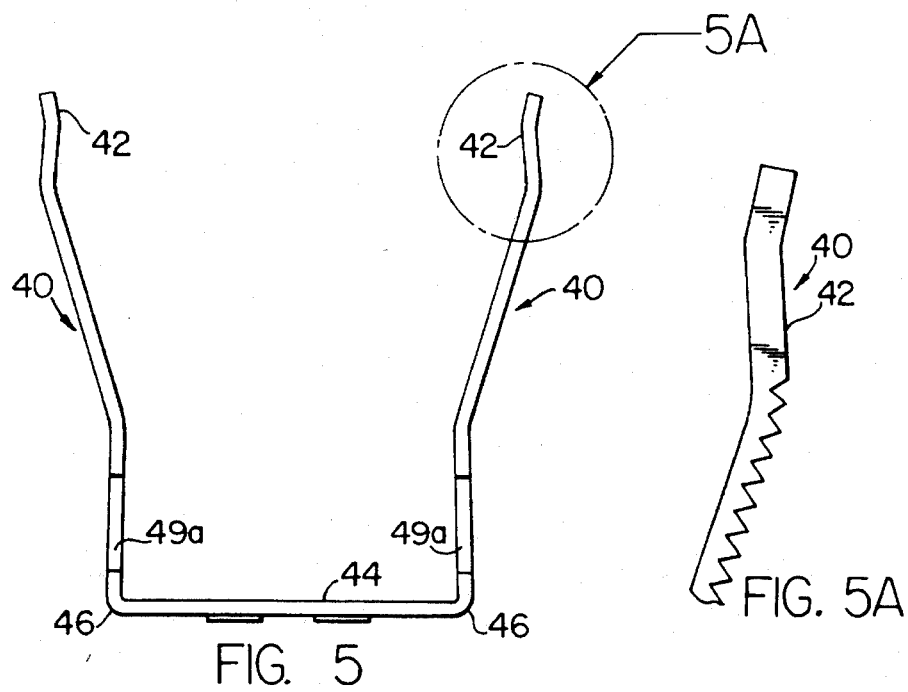
FIG. 5
FIG. 5A
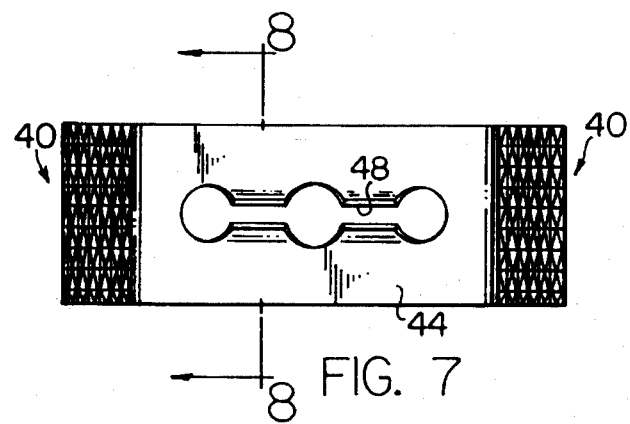
FIG. 7
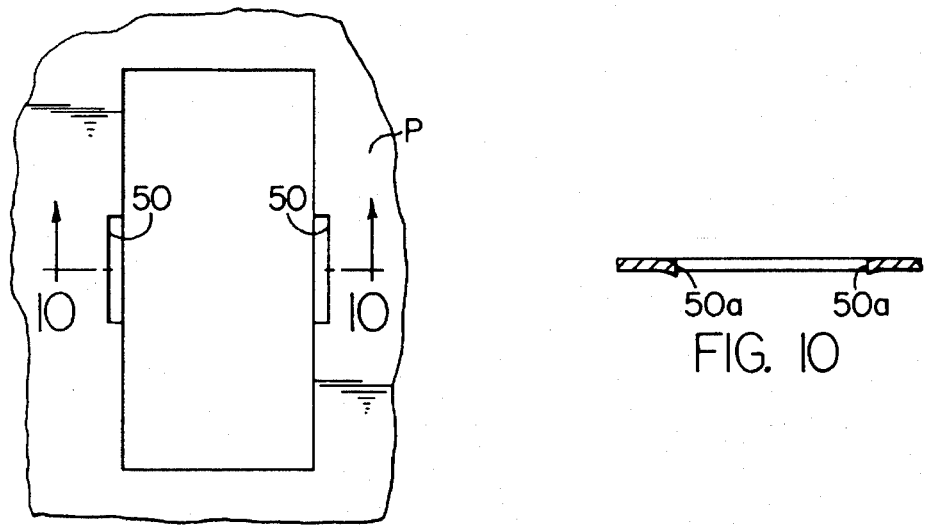
FIG. 9
FIG. 10

GROUNDING STRAP FOR PANEL MOUNTED ELECTRICAL SWITCH

BACKGROUND OF THE INVENTION

This invention relates generally to improvements in grounding one terminal of an electrical switch of a molded plastic switch case or housing, and deals more particularly with a grounding strap for such a switch. Rectangular switch cases with integrally formed wings for retaining the switch case or housing in a panel opening are known. See for example Sorenson U.S. Pat. No. 4,461,938 and Sorenson U.S. Pat. No. 4,929,807. Such rectangular switch cases are generally secured in a panel opening by the unique action of resilient plastic legs integrally molded at the end of the switch case. The legs have free end portions adapted to engage the ends of the panel opening or the sides of the panel opening or both, and cooperate with a bezel or flange provided on the top of the switch case. The bezel is adapted to engage the front side of the panel even as the free end portions of the resilient legs engage the edges and/or sides of the panel opening.

SUMMARY OF THE INVENTION

The present invention provides a unique grounding device or strap assembled with the molded plastic housing of the switch case or housing, which strap incorporates features of the resilient legs normally provided integrally on the plastic switch case, and which grounding strap is also adapted to be electrically connected to one of the terminals provided in the bottom wall of the switch case.

In accordance with the present invention a grounding strap is provided for a molded plastic housing of the type that includes a bezel for engaging the front side of a panel when the housing is received in a panel opening. The strap is preferably formed from a conductive metal material such as hardened steel and is formed into a U-shape having leg portions and a base integrally connected to one another at 90 degree bends so spaced apart as to snugly receive inner corners of the plastic housing defined at the juncture between the side walls of the switch case and the bottom wall of the switch case.

The one-piece U-shaped strap element has leg portions with free ends that are normally spaced apart and also spaced from the side walls of the plastic switch case. These normally spread leg portions are adapted to be moved toward one another as the case and associated strap are received in the panel opening.

An important feature of the present invention is to provide locating means on the leg portions of the metal strap that cooperate with mating portions defined by the molded plastic housing. A further feature provides for electrically connecting the base portion of the strap to a spade type terminal such as normally provided in such plastic switch case housings generally.

BRIEF DESCRIPTION OF THE DRAWINGS

FIG. 5 is an end elevational view of the grounding strap without the plastic switch housing.

FIG. 5A is a detail view of the free end portion of one leg of the strap illustrated in FIG. 5.

FIG. 7 is a bottom plan view of the strap illustrated in FIGS. 5 and 6.

FIG. 9 shows the preferred form for the panel opening or cutout, and

FIG. 10 is a sectional view taken on the line 10—10 of FIG. 9.

DETAILED DESCRIPTION OF THE PREFERRED EMBODIMENT

Figure 1:
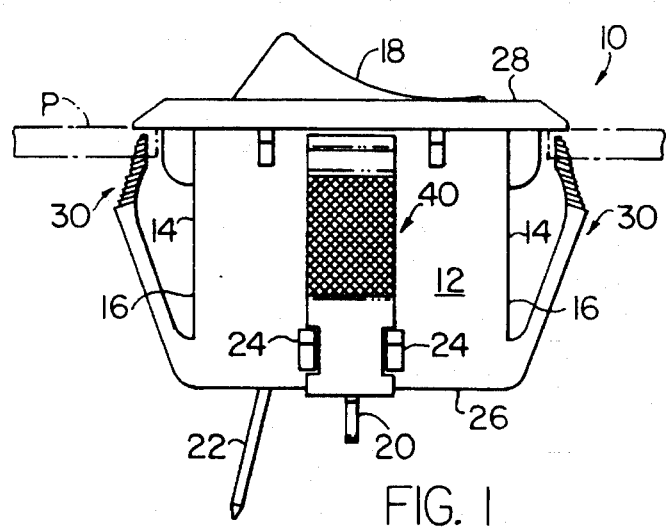
FIG. 1 is a side elevational view of a plastic molded electrical switch housing or case assembled with a grounding strap in accordance with the present invention.
Figure 3:
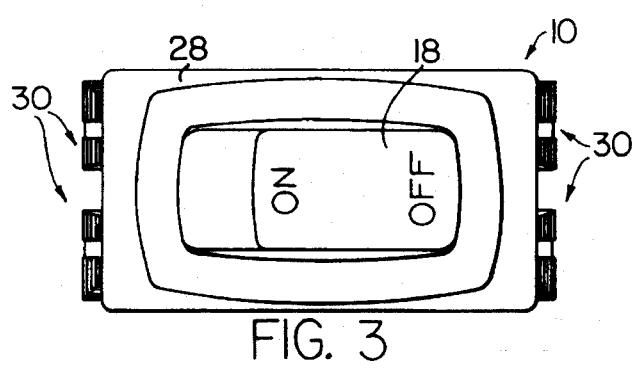
FIG. 3 is a top plan view of the assembly shown in FIGS. 1 and 2.
Figure 4:
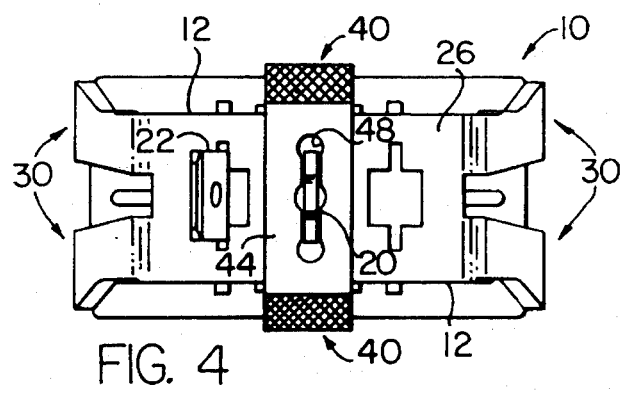
FIG. 4 is a bottom plan view of the assembly shown in FIGS. 1, 2 and 3.

Turning now to the drawings in greater detail, and particularly with reference to FIGS. 1 and 4, a switch case housing 10 of molded plastic, such as nylon is shown with opposed side walls 12, 12 and with end walls 14, 14 integrally connected at their adjacent vertical edges to form corners 16, 16. The housing 10 is upwardly open to receive a pivotably mounted rocker 18 as best shown in FIG. 3. The switch case housing 10 also includes a peripherally extending flange or bezel 28 extending around the upper edges of the side and end walls 12 and 14. This bezel projects outwardly to engage the front face of a panel illustrated in phantom lines at P in FIG. 1. The switch case housing 10 has electrically conductive metal tabs or terminals 20 and 22 provided in its bottom wall 26.

The above described plastic housing 10, the associated rocker 18, and the conductive terminal 22, are described more fully in the above mentioned prior art U.S. Pat. No. 4,461,938. This '938 patent is incorporated by reference herein, and describes in detail the resiliently deformable legs 30, 30 provided on the end walls 14 of the plastic switch case and molded integrally, therewith. These legs are adapted to flex both toward and away from the end walls, and toward and away from one another all as described in said '938 patent. As described in the '938 patent the free end portions of these legs are serrated as shown at 30a in FIG. 2 whereby to engage the edges of a panel opening during assembly of the plastic switch case housing with a panel. While the panel opening provided for such a switch case is of generally rectangular configuration all as described in the '938 patent, it is a feature of the present invention that the panel P has a rectangular panel opening that also includes relieved portions 50, 50 in the longer sides of the rectangular panel opening as illustrated in FIG. 9 for a purpose to be described. FIG. 10 shows that these relieved portions 50, 50 are upset slightly so as to form a relatively sharp edge, as indicated generally at 50a in FIG. 10, again for a purpose to be described hereinafter.

A further refinement from the prior art switch case housing of the above mentioned '938 patent lies in the provision of projecting tabs 24, 24 or locating lands in the lower region of the opposed side walls 12, 12 of the housing 10. These lands serve to cooperate with locating slots provided for this purpose in a unique grounding strap.

Figure 2:
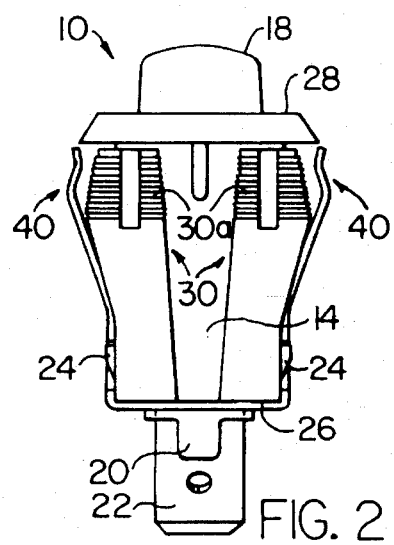
FIG. 2 is an end elevational view of the combination shown in FIG. 1.
Figure 6:
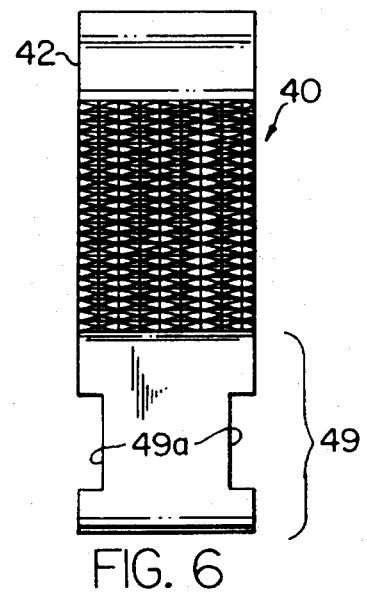
FIG. 6 is a side elevational view of the strap illustrated in FIG. 5.

Turning now to a more complete description of the grounding strap, FIG. 5 shows the preferred form for the grounding strap as comprising a U-shaped one-piece metal element having opposed leg portions 40, 40 that are spaced apart, and that are adapted to receive the switch housing therebetween as best shown in FIG. 2. These leg portions 40, 40 have free end portions 42, 42 and at least the portions of the one-piece element defining these leg portions is preferably fabricated from an electrically conductive resiliently deformable material such as metal, preferably hardened cold rolled steel. These free end portions 42, 42 are normally spread apart but are adapted to move toward one another as the housing and the metal grounding strap are received in the panel opening illustrated in FIG. 9. More specifically, the relieved portions 50, 50 of the panel opening of FIG. 9 are adapted to receive the free end portions of the strap, and in fact cooperate with these free end portions of the strap to provide a conductive path therebetween. The panel P is typically fabricated of an alloy of aluminium or other relatively soft metal, and the cold rolled steel strap is fabricated from a harder material so as to assure positive electrical conductive engagement between the upset panel edges referred to previously with reference to FIG. 10 at 50a, and serrated segments of the free end portions of the strap leg portions (See FIG. 6).

The one-piece metal U-shaped strap element also includes a base portion 44 that is integrally connected to the leg portions 40, 40 at 90 degree bends as indicated generally at 46, 46 in FIG. 5. This base portion 40 has an opening 48 as best shown in FIG. 7, which opening is adapted to receive the central depending conductive terminal or tab 20 provided in the bottom wall 26 of the molded plastic switch case housing all as illustrated in FIG. 4.

Referring now to FIG. 5, each strap leg portion 40 can be seen to have an intermediate segment between the free end portion and the lower portion thereof that is serrated and characterized by furrows and ridges whereby to improve the electrical conductive properties in the area of contact between said intermediate segment and the edge 50a of the panel opening as described above. This intermediate segment of each leg portion is provided with such a serrated surface segment along a significant portion of its length so as to achieve a scraping action of the metal grounding strap as it and the associated switch housing are inserted into the panel opening. This action serves to remove any paint or other non-conductive coating provided on the panel such as might otherwise interfere with the proper grounding of the assembly, and assures reliability of the resulting assembly for long periods of continuous use without the necessity for periodic maintenance and the like. Still with reference to FIG. 5, the leg portions 40 also include inner end portions 49 that define relieved areas 49a. These relieved areas are configured to cooperate with the tapered tabs 24, 24 provided on side walls 12 of the plastic switch case housing 10.

Figure 8:
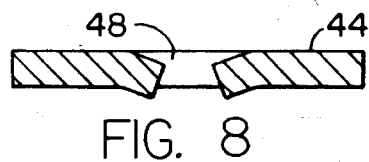
FIG. 8 is a sectional view taken generally on line 8—8 of FIG. 7.

Finally, and still with reference to the metal strap element of FIGS. 5–8 inclusively, FIG. 5a shows in somewhat more detail the configuration of the furrows and ridges provided in the intermediate segment of the leg portions 40. FIG. 8 illustrates the preferred upset given to at least portions of the edges of the slot 48 that is provided in the base 44 of the U-shaped grounding strap whereby to cooperate with the depending conductive tab 20 of the switch case housing and to thereby assure positive electrical contact between this tab 20 and the grounding strap. The tab 20 is preferably fabricated from brass or other conductive material with the result that the hardened cold rolled steel strap achieves a burnishing action on the panel edges when assembled with the tab 20, further improving the electrical conductivity between said tab 20 and the grounding strap. Tab 20 is similar to terminal 22, but is not long enough to receive a conventional wire connector. This feature is intentionally incorporated in the design to eliminate the possibility of attaching a wire to this center tab 20.

We claim:

1. The combination comprising a molded plastic switch housing, a bezel flange surrounding upper end of said housing, at least one conductive terminal projecting from a bottom wall of said housing, and locating tabs provided on side walls of said housing, a one-piece U-shaped strap element having leg portions that are spaced apart to receive the switch housing and having locating means provided on said leg portions to receive said switch housing tabs, said leg portions having free ends formed from an electrically conductive resiliently deformable material, said free ends normally spaced apart and adapted to move toward one another as the housing and strap are received in a panel opening, and said one-piece U-shaped strap element having a base portion defining an opening for receiving said switch housing terminal.

2. The combination according to claim 1 wherein said strap leg portions have segments intermediate said inner ends and said free ends thereof, said intermediate segments shaped so as to normally form an angle with said base portion that is in excessive of 90 degrees, and said intermediate segments having outside surfaces characterized by furrows and ridges whereby to improve the electrically conductive properties in the area of contact between said intermediate segments and the panel opening.

3. An electrical switch comprising:

a housing that includes a bezel flange for engaging the front of a panel when the housing is received in a panel opening, said housing including at least one conductive terminal in a bottom wall thereof generally opposite the bezel flange, a one-piece U-shaped strap element having leg portions that are spaced apart to receive side walls of the switch housing therebetween said U-shaped strap element having a base portion defining an opening for conductively receiving said terminal, said strap element leg portions having segments intermediate inner ends connected to said base portion portion and free ends thereof, said intermediate segments shaped to normally form an angle with base that is in excess of 90°, and said intermediate segments further including outside segments characterized by furrows and ridges to improve the electroconductive properties thereof in the area of contact between said intermediate segments and the panel opening.

4. The combination according to claim 3 wherein said opening in said base portion of said strap element provides an interference fit with the terminal of said switch housing.

5. An electrical switch comprising:

a housing that includes a bezel flange for engaging the front of a panel when the housing is received in a panel opening, said housing including at least one conductive terminal in a bottom wall thereof generally opposite the bezel flange, a one-piece U-shaped strap element having leg portions that are spaced apart to receive the side walls of the switch housing therebetween said U-shaped strap element having a base portion defining an opening for conductively receiving said terminal, said strap element leg portions defining locating means mating with cooperating portions of the housing side walls, said leg portions having their inner ends resiliently connected to said base portion whereby said leg portions are normally set apart and spaced from the housing side walls but are compressed in contact with the side walls when the switch and strap are inserted into the panel opening.

6. The combination according to claim 5 wherein said opening in said base portion of said strap element provides an interference fit with the terminal of said switch housing.

* * * * *

UNITED STATES PATENT AND TRADEMARK OFFICE
CERTIFICATE OF CORRECTION

PATENT NO. : 5,527,991
DATED : June 18, 1996
INVENTOR(S) : Walter A. Sadowski

It is certified that error appears in the above-indentified patent and that said Letters Patent is hereby corrected as shown below:

Column 4, Line 46, delete the second occurrence of the word "portion".

Column 4, Line 48, add the word --the-- after the word "with".

Column 4, Line 48, add the word --portion-- after the word "base".

Column 4, Line 66, delete both occurrences of the word "the"

Signed and Sealed this

Fourteenth Day of January, 1997

Attest:

BRUCE LEHMAN

Attesting Officer

Commissioner of Patents and Trademarks